United States Patent [19]
Wieting et al.

[11] Patent Number: 5,203,436
[45] Date of Patent: Apr. 20, 1993

[54] REINFORCED TUBULAR DOOR SUPPORT

[75] Inventors: Enno Wieting, Ratingen; Joachim Fischer, Mülheim, both of Fed. Rep. of Germany

[73] Assignee: Mannesmann Aktiengesellschaft, Dusseldorf, Fed. Rep. of Germany

[21] Appl. No.: 725,006

[22] Filed: Jul. 2, 1991

[30] Foreign Application Priority Data

Jul. 2, 1990 [DE] Fed. Rep. of Germany ....... 4021235

[51] Int. Cl.⁵ .............................. F16F 7/12; B60J 5/00
[52] U.S. Cl. ................................ 188/377; 296/146 R; 296/189
[58] Field of Search ................. 188/371-377; 296/146, 188, 189; 293/133; 267/71, 74, 166, 180, 226, 287; 138/38, 42, 131, 139, 144, 172; 16/197

[56] References Cited

U.S. PATENT DOCUMENTS

| | | | |
|---|---|---|---|
| 54,346 | 5/1866 | Hill | 267/180 X |
| 2,864,405 | 12/1958 | Young | 138/38 |
| 3,271,812 | 9/1966 | Skolnik | 16/197 |
| 3,364,622 | 1/1968 | Collard | 16/197 X |
| 3,464,450 | 9/1969 | Steffenini | 138/172 X |
| 3,478,384 | 11/1969 | Skolnik | 16/197 |
| 3,589,687 | 6/1971 | Leybaurne | 138/38 X |
| 3,675,746 | 7/1972 | Irvine | 188/377 |
| 3,868,141 | 2/1975 | Johnson | 296/189 |
| 4,488,751 | 12/1984 | Kling | 296/188 X |
| 4,685,722 | 8/1987 | Srock | 296/188 |
| 4,866,883 | 9/1989 | Brown et al. | 296/188 X |
| 4,945,682 | 8/1990 | Altman et al. | 296/146 X |

FOREIGN PATENT DOCUMENTS

| | | | |
|---|---|---|---|
| 113084 | 8/1899 | Fed. Rep. of Germany . | |
| 2645382 | 4/1977 | Fed. Rep. of Germany | 188/371 |
| 3151861 | 7/1983 | Fed. Rep. of Germany | 296/188 |
| 3411634 | 10/1985 | Fed. Rep. of Germany | 296/188 |
| 3621697 | 1/1988 | Fed. Rep. of Germany . | |
| 729287 | 5/1955 | United Kingdom | 16/197 |
| 1489065 | 10/1977 | United Kingdom | 188/377 |

Primary Examiner—Robert J. Oberleitner
Assistant Examiner—Alfred Muratori
Attorney, Agent, or Firm—Cohen, Pontani, Lieberman, Pavane

[57] ABSTRACT

A deformable, reinforced tubular door member for absorbing energy occasioned by an impact force exerted thereupon is disclosed, having a deformable tube having an open space therewithin, and a spiralled stiffening element positioned within the open space of the deformable tube and having a plurality of surface elements which are arranged such that when the impact force is exerted upon the tubular member, the elements exert a resisting force against the tubular member. In one embodiment, the stiffening element is a coiled or spiral spring. In another embodiment, the stiffening element is a strip which is twisted about its lengthwise axis so that the surface elements are arranged in a double helix. In a still further embodiment, the strip is twisted in order that it have one twist per centimeter.

5 Claims, 2 Drawing Sheets

REINFORCED TUBULAR DOOR SUPPORT

FIELD OF THE INVENTION

The present invention relates to a tubular support for reinforcing a door or other structural member of a motor vehicle, particularly a passenger car, and more particularly to such a support specifically adapted to dampen and distribute the forces exerted during an impact by deforming.

BACKGROUND OF THE INVENTION

Regulations promulgated by various agencies of the United States government, as well as worldwide general endeavors, are directed to reducing the consumption of fuel, thereby compelling automobile manufactures to effect drastic reductions in the weight of motor vehicles. As a consequence, solid structures are no longer used in such specialized fields of use.

Instead, door-reinforced tubes have been substituted to secure the passenger space of a passenger car by stiffening the door structure and absorbing deformation work during an impact or collision. In other words, such tubes absorb the energy of impact (up to a point) and dissipate such energy by deforming, thereby preventing the door or other structure from buckling and injuring the passenger.

For example, in Federal Republic of Germany No. 3,621,697, stiffening grids are arranged within a hollow tubular section in a honeycomb, lenticular, square, or round cross-sectional profile. Such a configuration reduces the weight of the structure while simultaneously assuring a high degree of safety. However, reinforced tubes having stiffening grids arranged therewithin in the particular orientations shown in the prior art are disadvantageous in that during impact, when forces are exerted perpendicular to the longitudinal axis of the reinforcement tube, different opposing forces are produced depending upon the orientation of the tube. Consequently, such a door-reinforcement tube will take up different deformation work in different directions, and in other directions will buckle. Yet an additional disadvantage of such a tube, beyond the non-uniformity in deformation work, results from the great expense involved in both the manufacture and installation of the stiffening grids within the tubes in the particular configurations shown.

Federal Republic of Germany Patent No. 113,084 shows the use of a so-called "flexural spring" as a stiffening element within a tubular support in order to prevent the tube from buckling, a technique which originates from the field of tube bending. This flexural spring is further provided with head plates at its ends so that the spring can be introduced into the tube and removed after the bending operation is completed, and a chain or cable which is turnably fastened to one head plate is also provided.

OBJECTS OF THE INVENTION

It is, therefore, an object of the present invention to provide a door-reinforcement tube which is simple to manufacture.

It is another object of the present invention to provide a door-reinforcement tube which withstands high and sudden bending stresses, as in a collision, by absorbing such stresses and deforming instead of buckling.

It is a further object of the present invention to provide a door-reinforcement tube wherein the stiffness, flexural strength and capacity to translate impact energy into deformation work are independent of the radial operation of the tube with respect to the direction of loading.

SUMMARY OF THE INVENTION

The foregoing objects, and other objects of the instant invention are achieved by the provision of a deformable, reinforced tubular door member for absorbing energy occasioned by an impact force exerted thereupon, having a deformable tube having an open space therewithin, and a spiralled stiffening element positioned within the open space of the deformable tube and having a plurality of surface elements which are arranged such that when the impact force is exerted upon the tubular member, the elements exert a resisting force against the tubular member. In one embodiment, the stiffening element is a coiled or spiral spring. In another embodiment, the stiffening element is a strip which is twisted about its lengthwise axis so that said surface elements are arranged in a double helix. In a still further embodiment, the strip is twisted in order that it have one twist per centimeter.

Accordingly, it is a feature of the instant invention that the stiffening elements described herein are simple to construct, yet very effective in deformation and energy distribution.

It is another feature of the instant invention that the spiral spring or strip twisted about its lengthwise axis as a stiffening element absorb impact forces and deform regardless of the orientation of the tubular support with respect to such impact forces.

It is a further feature of the instant invention that the deformable, reinforced tubular door member is simple to manufacture.

It is a still further feature of the instant invention that the deformable, reinforced tubular door member provides improved safety to a person occupying a motor vehicle or other device in which the door member is positioned, in that, as a consequence of the design, the tube deforms in an arcuate shape rather than buckling in a wedge shape.

BRIEF DESCRIPTION OF THE DRAWINGS

Other objects and many of the attendant advantages and features of the present invention will be readily appreciated and better understood by reference to, and consideration of the detailed description of the invention together with the accompanying drawings wherein like reference numerals designated similar parts throughout the figures thereof, and wherein.

DETAILED DESCRIPTION OF THE INVENTION

Figure 1:
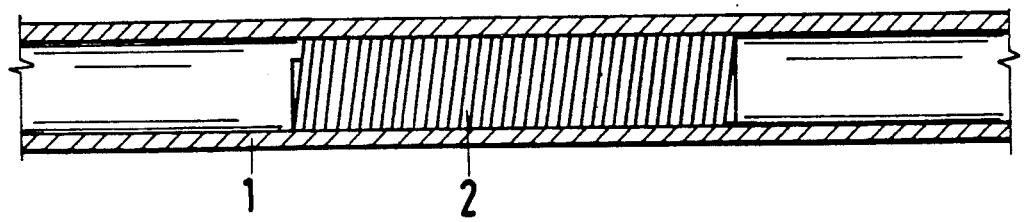
FIG. 1 is a cut away view of a door-reinforcement tube in accordance with an embodiment of the invention wherein a spiral spring is positioned as the stiffening element.

In FIG. 1, a deformable reinforced tubular door member is shown in accordance with one embodiment of the invention, having a door-reinforcement tube 1 having an open space therewithin and a spiral spring 2 placed within the open space of the tube 1 which as a stiffening member for the tube 1. The spiral spring 2 extends, in the embodiment shown in FIG. 1, within the middle third of the length of the tube 1, since it has been determined from experience that the region of a door-reinforcement tube which is subject to buckling is substantially limited to this region.

Figure 2:
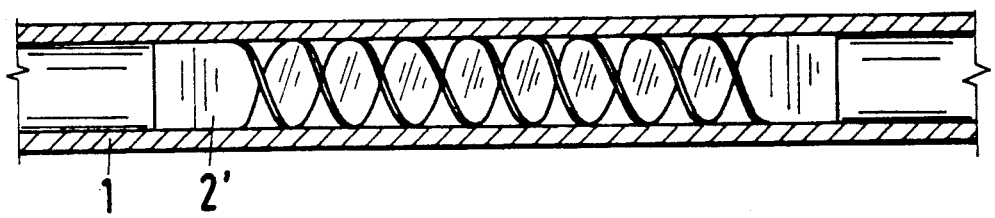
FIG. 2 is a cut away view of a door-reinforcement tube in accordance with a preferred embodiment of the invention wherein the stiffening member is a strip which is twisted about its longitudinal axis.

In FIG. 2, a strip 2' is positioned within tube 1. Strip 2', in the embodiment shown in FIG. 2, has a longitudinal axis running substantially its length and is twisted about this longitudinal axis so that the peripheral edge or surface elements of the strip (shown as edges 3 and 4 in FIG. 3) define a double helical arrangement, and these edges abut the inner surface of the tube 1. The twisted strip 2' extends, as in the embodiment shown in FIG. 1, only over the middle third of the length of the door-reinforcement tube 1.

Figure 3:
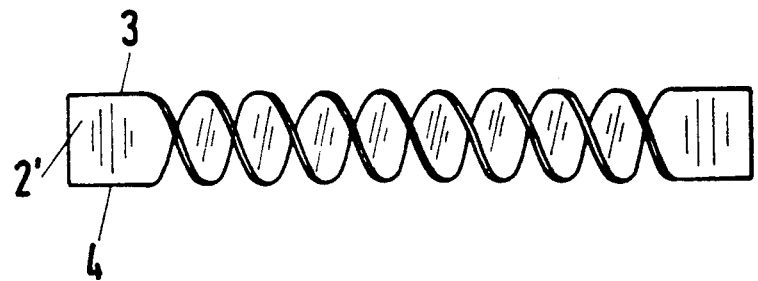
FIG. 3 is a cut away view of the twisted-strip stiffening element shown in FIG. 2.

The twisted strip 2', as a stiffening element, is shown in detail in FIG. 3. In FIG. 3, the special nature of the rotational symmetry of the strip 2' is apparent. As a result of the structure of the strip 2', the stiffness of the door-reinforcement tube is rendered independent of the radial orientation of the strip 2' within the tube 1. Consequently, the a door member reinforced with a deformable tube in accordance with the embodiments shown in FIGS. 2 and 3 will transfer an impact force exerted upon it to the tube, and the tube will applies opposing forces in all radial directions to counter the impact force.

In FIG. 3, the strip 2's is shown having surface elements or edges 3 and 4, such that twisting of the strip 2' results in these edges lying within a geometric conformation resemblin a double helical structure. Consequently, the surface elements of the stiffening member or strip 2' extend radially outwardly from the longitudinal axis of the strip 2' in virtually all directions, and thus, when abutting the internal surface of tube 1, provide support for virtually the entire tube 1.

It should be appreciated that when the stiffening element is either the spiral spring 2 or twisted strip 2', the stiffening element has surface or peripheral elements which abut the internal face of the tube 1, and thus are arranged parallel to forces that act upon the arrangement from the outside, as in a collision or other blow, and thereby oppose these forces.

The twisted strip 2' has, advantageously one turn per centimeter. In order to achieve this number of turns, the inside diameter of the tube 1, and thus the width of strip 2' from edge 3 to edge 4, is selected within the range of about 15 mm to 35 mm. Dimensions greater than this range would require a greater anticipated cost of manufacture.

With respect to materials, it is preferred that the stiffening element 2 or strip 2' be comprised of a metallic material, preferably steel. Likewise, the tube 1 may also be comprised of steel. In addition to the use of steel as the material for either or both the tube 1 and element 2 or strip 2', one skilled in the art can replace this material with fiber-reinforced plastics, or materials having a base of carbon or glass. Likewise, it is also conceivable, and within the scope of the instant invention, to combine these materials with each other, such that, for example, the tube 1 consists of steel, and the stiffening elements 2 and 2' consist of one of the other above-mentioned materials.

Likewise, elements 2 and 2' can be welded, bonded, foamed (with filling foam) or fitted in place. Elements 2 and 2' are also attached in unloaded condition. In the loaded condition, due to the narrow adaptation of the stiffening elements 2 and 2' to the door-reinforced tube 1, the stiffening elements are displaced only slightly, and thus in the desired manner.

Figure 4:
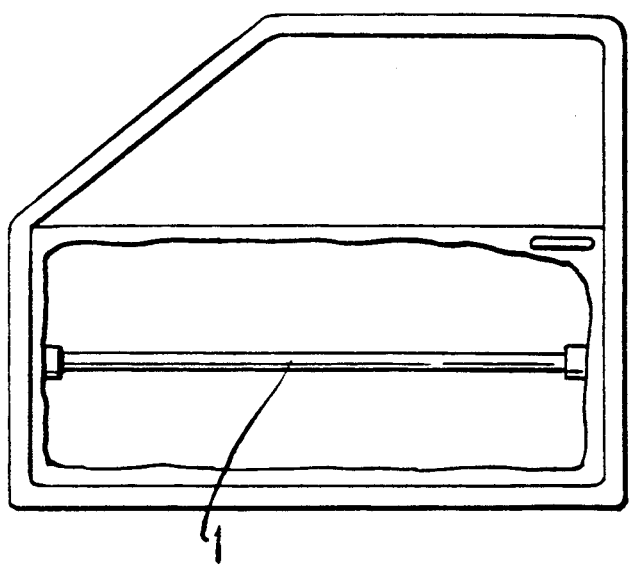
FIG. 4 is a schematic view showing the door-reinforcement to be mounted on a vehicle door.

FIG. 4 of the drawing schematically illustrates the reinforced tubular door member of FIGS. 1 and 2 mounted in a vehicle door.

Accordingly, while there have been shown, described and pointed out the fundamental novel features of the invention as applied to preferred embodiments thereof, it will be understood that various omissions, substitutions and changes in the form and details of the devices illustrated and in its operation and method may be made by those skilled in the art without departing from the spirit of the invention. It is the intention, therefore, to be limited only as indicated by the scope of the claims appended hereto.

We claim:

1. A deformable, reinforced tubular door member mounted in a vehicle door for reinforcing the vehicle door and for absorbing energy occasioned by an impact force exerted thereupon, comprising:
    a deformable tube having an inner wall surface;
    a spiralled stiffening element positioned within said deformable tube and having a plurality of surface elements which are arranged so as to rest against said inner wall surface such that when the impact force is exerted upon the tubular door member, said surface elements exert a resisting force against said deformable tube, said spiralled stiffening element comprising a strip having peripheral edges and a lengthwise axis, said strip being twisted along said lengthwise axis, wherein said surface elements comprise said peripheral edges, and wherein said surface elements have a repeating double helical geometry.

2. The deformable, reinforced tubular door member of claim 1, wherein said spiralled stiffening element is a coiled spring.

3. The deformable, reinforced tubular door member of claim 1, wherein said stiffening element is comprised of a metallic material.

4. The deformable, reinforced tubular door member of claim 1, wherein said stiffening element is bonded to said deformable tube.

5. The deformable, reinforced tubular door member of claim 1, wherein said stiffening element is welded to said deformable tube.

* * * * *